Nov. 27, 1962

D. WARDELL 3,065,891

TAPE MOTION CONTROL MECHANISMS

Filed April 13, 1959

2 Sheets-Sheet 1

Inventor
DONALD WARDELL
By Larson and Taylor
Attorney

Inventor
DONALD WARDELL
By Larson and Taylor
Attorney

United States Patent Office 3,065,891
Patented Nov. 27, 1962

3,065,891
TAPE MOTION CONTROL MECHANISMS
Donald Wardell, Woodmancote, near Cheltenham, England, assignor to National Research Development Corporation, London, England, a British corporation
Filed Apr. 13, 1959, Ser. No. 805,903
Claims priority, application Great Britain Apr. 28, 1958
12 Claims. (Cl. 226—95)

The present invention relates to tape motion control mechanisms suitable for controlling the motion of magnetic tape past magnetic heads on a magnetic tape recording machine, or for controlling the motion of tape on which information is recorded or read by optical, electrostatic or other means.

In the case of certain tape recording or reading systems and in particular in the case of those magnetic tape systems used in conjunction with digital computing engines, it is desirable that the tape movement past the recording or reading heads, or both, should be rapidly controlled. In such systems, the tape is caused to move past the recording or reading heads by means of a capstan and such movement is arrested by the application of a brake. The tape may be caused to adhere to the capstan, or alternatively to the brake, by applying a partial vacuum to a foraminated surface over which the tape passes. The application of the partial vacuum may be controlled by electrically operated control valves. Normally these air control valves consist of an electro-magnet the armature of which is linked to a separate mechanical air valve to open or to close the air valve under the control of electrical signals applied to the electro-magnet. These air control valves tend to be slow in operation because of the mechanical inertia of both the armature and the mechanical air valve.

It is an object of the present invention to provide a tape motion control mechanism including an electrically operated control valve which has a rapid response to control signals applied to it.

In known tape motion control systems the air control valves controlling the application of a partial vacuum to the foraminated surfaces over which the tape passes are located at a considerable distance away from the foraminated surfaces. This results in a time lag between the operation of a control valve and the application of the corresponding air pressure to the corresponding surface. This is because the pressure wave resulting from the operation of the control valve takes time to travel to the surface.

It is a further object of the present invention to provide a tape motion control mechanism in which the control valves are so constructed that they may be located in close proximity to the foraminated surfaces at which the tape motion is to be controlled.

According to the present invention, there is provided a tape motion control mechanism including an air control valve which includes an electromagnet having a hole through a limb of a ferromagnetic core to form an orifice at a pole face of the core, a ferromagnetic diaphragm located adjacent the pole face so as to close the orifice when the electromagnet is energized and means for urging the diaphragm away from the pole face to open the orifice when the electromagnet is not energized.

The air control valve may be housed in a capstan mechanism for controlling movement of the tape. In this case the hole through the limb of the ferromagnetic core communicates with a foraminated surface of the capstan over which surface the tape runs. A partial vacuum is applied to the region of the diaphragm so that when the orifice is open, the partial vacuum is applied to the foraminated surface with the result that the tape is pressed by external air pressure on to the surface and is driven thereby.

When the orifice is closed by the diaphragm, the tape is free to slip on the surface and is no longer driven by the capstan.

Alternatively, the air control valve may be located close to a foraminated surface or foraminated surfaces over which the tape passes so as to provide a pneumatic brake for the tape. In this case, the hole through the limb of the ferromagnetic core communicates with a cavity behind the, or each, foraminated surface. The diaphragm acts as an air valve controlling the application of a partial vacuum to the surface or surfaces as in the case of the capstan mechanism.

The aforementioned means for urging the diaphragm away from the pole face is preferably a second electromagnet located on the side of the diaphragm remote from the pole face. This second electromagnet is arranged to be energized when the air control valve is required to be open.

In order that the invention may be more clearly understood, embodiments of the invention will now be described, by way of example, with reference to the accompanying drawings, in which.

Figure 1:
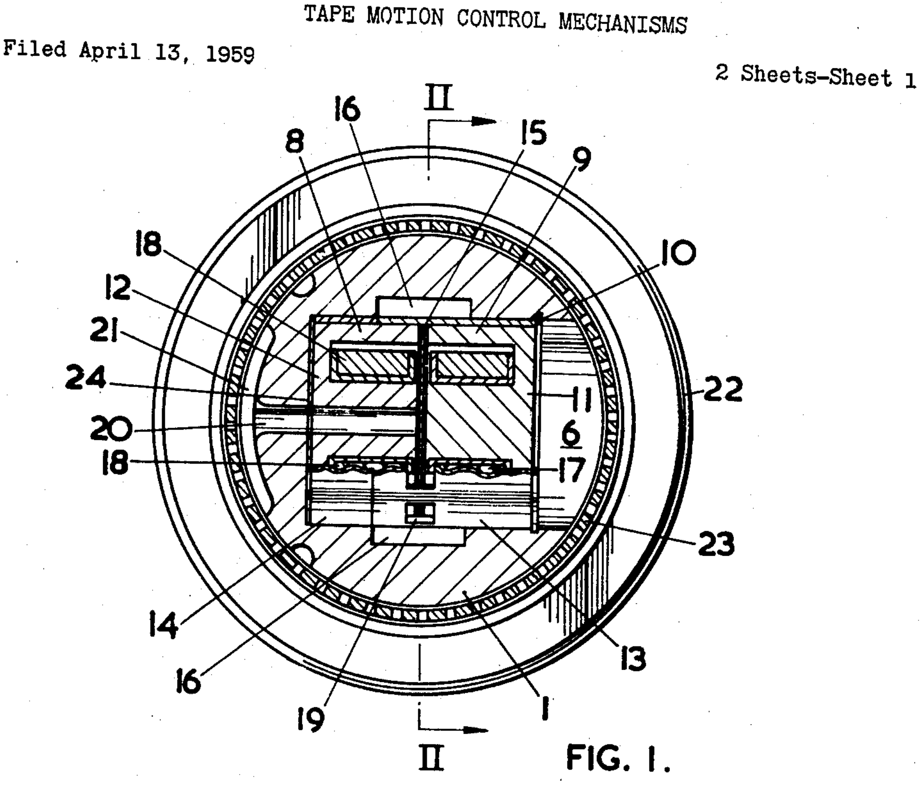
FIGURE 1 is a part-sectional view of a capstan tape driving mechanism for a magnetic tape.
Figure 2:
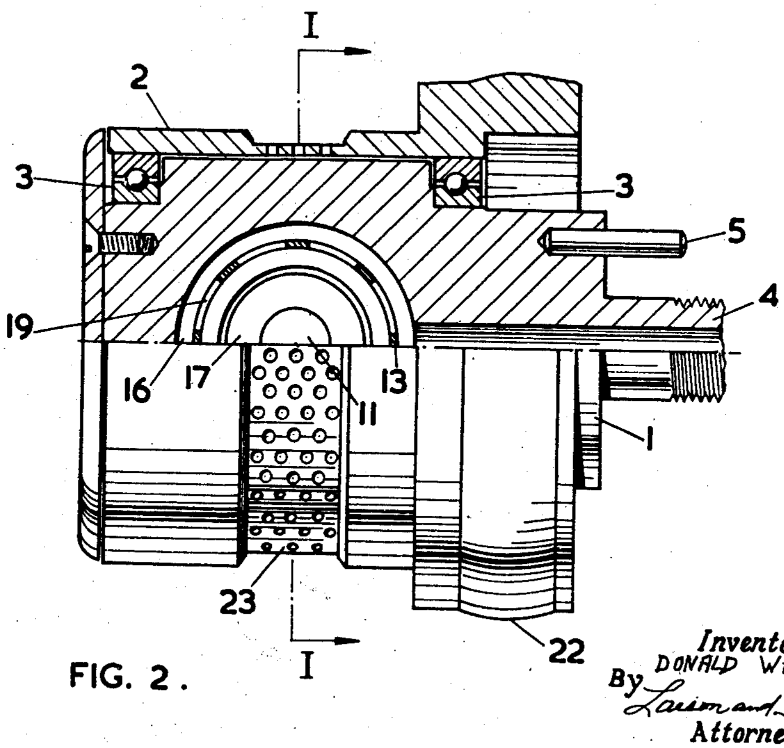
FIGURE 2 is a part-sectional view, taken along the line II—II in FIGURE 1, of the capstan tape driving mechanism

FIGURE 1 is a part-sectional view of the capstan tape driving mechanism, the section being taken on the line I—I in FIGURE 2. FIGURES 1 and 2 show an inner portion 1 of the capstan upon which an outer portion 2 is rotably mounted by means of bearings 3. The inner portion 1 may be located in a tape deck (not shown) by means of a hollow stem 4 and a pin 5. The inner portion 1 of the capstan has a cylindrical cavity 6 in which two electromagnets 8 and 9 are housed. The two electromagnets 9 and 8 consist of two pot cores 11 and 12, such as are well known for use as transformer cores in the radio engineering art, on the center limbs of which are electrical windings 17 and 18 respectively. The pot cores may be made of any suitable ferrite material. The two pot cores are encompassed by two brass ferrules 13 and 14 which are cemented to the cores by means of a suitable adhesive, such as an epoxy resin. The length of the ferrules is adjusted so that when the pot cores are assembled in the ferrules face-to-face with one another, the space between the faces is 0.0275 inch. The electromagnet assembly 9, 8, 13 and 14 is held in place by a circlip 10.

A diaphragm disc 15 of ferromagnetic material, such as stalloy, and 0.0125 inch thick is freely movable within the space between the pot core faces. The diaphragm 15 thus has a total free movement of 0.015 inch. The space in the region of the diaphragm between the faces of the pot cores communicates with an annular space 16 via holes 19 in the brass ferrule 13. The annular space 16 is connected to a source of partial vacuum for example, a reservoir attached to a vacuum pump through the hollow stem 4. A cylindrical hole 20 is drilled in the center limb of the pot core 12 and the inner portion 1 of the capstan and communicates between the space between the pot core faces and a further, arcuate, space 21 on the outside of the inner portion 1 of the capstan. The inner and outer limbs of the pot cores are lapped flat so that the diaphragm 15 can rest flat in contact with both limbs of each core so as to provide a good air seal with either one or the other of the center limbs. Leakage between the annular space 16 and the hole 20 is prevented by a sealing washer 24.

The outer portion 2 of the capstan consists essentially of a convex pulley surface 22, which accommodates a belt drive (not shown in FIGURE 2) to the capstan, and a foraminated cylindrical driving surface 23 for accommodating the magnetic tape (not shown in FIGURE 2). As will be seen hereinafter from the description with reference to FIGURE 3, the magnetic tape passes over an arc of the outer portion 2 of the capstan. The space 21 is arranged to lie in this arc. Thus, a partial vacuum created in the space 21 will be conveyed through the foraminated surface 23 to the tape. External air pressure will then press the tape on to the surface 23 causing the tape to be driven by the capstan. If, however, there is no partial vacuum conveyed to the tape, the tape will be able to slip over the foraminated surface 23 even though the outer portion 2 of the capstan is still rotating.

The application of the partial vacuum to the tape is controlled by means of the diaphragm 15. The partial vacuum is conveyed via the hollow stem 4 and the annular space 16 to the inter-core space whence it is either allowed to pass through the hole 20 to the space 21 if the electromagnet 9 is energized to draw the diaphragm 15 to it or is shut off therefrom if the electromagnet 8 is energized to cause the diaphragm 15 to seal off the orifice of the hole 20. Only one of these electromagnets is energized at any one time, their energization being controlled by suitable electrical switches (not shown).

Figure 3:
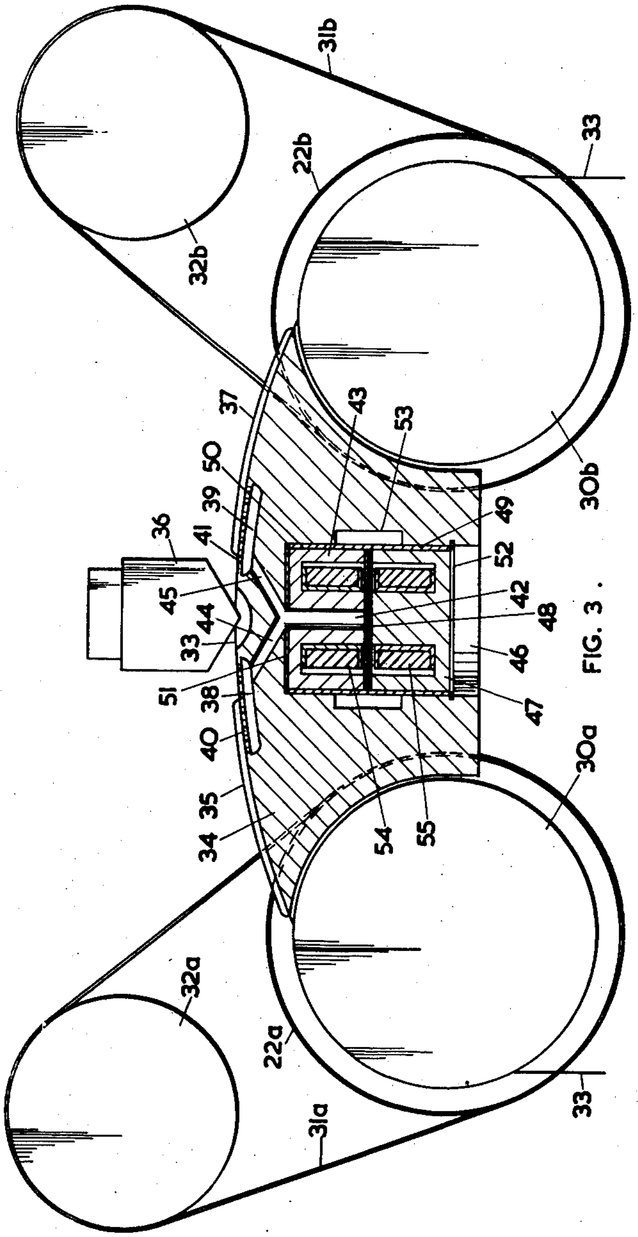
FIGURE 3 is part-sectional view of the essential features of a complete tape motion control mechanism.

FIGURE 3 shows two capstans **30*a* and 30*b* of the type illustrated in FIGURES 1 and 2 driven on their convex pulley surfaces 22*a* and 22*b* by belts 31*a* and 31*b* from motor drive pulleys 32*a* and 32*b*. A magnetic tape 33 passes over the capstan 30*a*, between a guide member 34 and a guide plate 35, over a reading head 36, between the guide member 34 and another guide member 37 and thence over the capstan 30*b*. The guide member 34 has two cavities 38 and 39 formed therein. These cavities have foraminated walls 40 and 41 respectively over which the tape passes. The cavities 38 and 39 communicate with a hole 42 in the center limb of a pot core 43 via two ducts 44 and 45** respectively.

The pot core 43 is assembled in a cylindrical cavity 46 in the guide member 34 together with a second pot core 47 and a diaphragm 48, similarly to the manner in which similar components are assembled in the capstan shown in FIGURES 1 and 2, by means of brass ferrules 49 and 50, a sealing washer 51 and a circlip 52. Electrical windings 54 and 55 are provided for magnetically energizing the pot cores 43 and 47 respectively. The diaphragm 48 operates in a similar manner to the diaphragm 15 shown in FIGURE 1. A partial vacuum is applied to the region of the diaphragm by means of an annular space 53 and is conveyed to the two cavities 38 and 39 or not according to whether the pot core 47 or the pot core 43 respectively is magnetically energized. The tape is held to the foraminated walls 40 and 41 of the cavities 38 and 39 whenever a partial vacuum is applied to the cavities and is thus prevented from moving. Thus, the energization of the winding 54 allows movement of the tape while the energization of the winding 55 prevents movement of the tape. The energization of these windings may be controlled by means of suitable electrical switches (not shown).

The ducts 44 and 45 (FIGURE 3) and that portion of the hole 20 between the core 12 and the space 21 (FIGURE 1) are made as short as possible. In one construction of a tape motion control mechanism they were each made ⅜ inches long.

During the operation of the complete tape movement control device shown in FIGURE 3, a partial vacuum is applied either to the foraminated driving surfaces of the capstans **30*a* and 30*b* to cause the tape 33 to be driven thereby or, alternatively, to the cavities 38 and 39 to cause the tape 33** to stop. Control of the tape is rapid because not only are the valves situated close to their respective operating points but also the valves are inherently fast acting due to the low mass and short travel of their moving parts. The application of the partial vacuum is controlled by the energization of the appropriate electrical windings as hereinbefore described. In turn, the energization of the electrical windings may be controlled by any suitable known form of electrical circuit.

I claim:

1. A tape motion control mechanism including a control member formed with a foraminated surface over which a tape passes; an air control valve adjacent said control surface, said air control valve including an electromagnet having a ferromagnetic core formed with a hole therethrough to form an orifice at a pole face thereof, a ferromagnetic diaphragm located adjacent the pole face so as to close the orifice when the electromagnet is energized and means for urging the diaphragm away from the pole face to open the orifice when the electromagnet is not energized; and a duct connected between the air control valve and said control member.

2. A tape motion control mechanism as claimed in claim 1 and wherein the means for urging the diaphragm away from the pole face includes a second electromagnet located on the side of the diaphragm remote from the said pole face.

3. A tape motion control mechanism including a control member formed with a foraminated surface over which a tape passes; an air control valve adjacent said control surface, said air control valve including an electromagnet having a ferromagnetic core with a hollow cylindrical outer limb and a cylindrical inner limb formed with a hole therethrough to form an orifice at the pole-face thereof, the cross-section of the said core through the longitudinal axis of the inner limb being substantially E-shaped, and a winding on the inner limb; a ferromagnetic diaphragm located adjacent the pole face so as to close the orifice when the electromagnet is energized and means for urging the diaphragm away from the pole face to open the orifice when the electromagnet is not energized; and a duct connected between the air control valve and said control member.

4. A tape motion control mechanism as claimed in claim 3 and wherein the means for urging the diaphragm away from the pole face includes a second electromagnetic having a ferromagnetic core with a hollow cylindrical outer limb and a cylindrical inner limb so that the core has a substantially E-shaped cross-section through the longitudinal axis of the inner limb, and a winding on the inner limb, the second electromagnet being located on the side of the diaphragm remote from the said pole face.

5. In a tape motion control mechanism, a capstan including a stationary inner part; an outer part rotatable thereon; a cylindrical foraminated portion of the outer part for accommodating tape; located in the said inner part an air control valve comprising a first electromagnet having a ferromagnetic core formed with a hole therethrough to form an orifice at a pole face thereof, a ferromagnetic diaphragm located adjacent the pole face so as to close the orifice when the electromagnet is energized and means for urging the diaphragm away from the pole face to open the orifice when the electromagnet is not energized and means for applying a partial vacuum to the region of the diaphragm, the said inner part being formed with an arcuate space in communication with part of the said foraminated portion and a duct connecting the said arcuate space to the said hole in the ferromagnetic core.

6. In a tape motion control mechanism, a capstan as claimed in claim 5 and wherein the means for urging the said diaphragm away from the pole face includes a second electromagnet located on the side of the diaphragm remote from the said pole face.

7. In a tape motion control mechanism, a capstan as claimed in claim 6 and wherein the electromagnets each have a ferromagnetic core with a hollow cylindrical outer limb and a cylindrical inner limb so that the core has a substantially E-shaped cross-section through the longitudinal axis of the said inner limb and each have a winding on the inner limb.

8. In a tape motion control mechanism, a capstan as claimed in claim 7 and wherein the inner limb of the core of said first electromagnet has said hole formed therein.

9. In a tape motion control mechanism, a capstan as claimed in claim 8 and wherein the ferromagnetic core of each electromagnet is a pot core of the type used in radio-frequency transformers.

10. In a tape motion control mechanism, a capstan as claimed in claim 9 and wherein the cores are encompassed by and bonded to, two cylindrical non-ferromagnetic ferrules so as accurately to space apart the pole faces of the two electromagnets, one of the ferrules encompassing one of the cores and part of the other of the cores.

11. In a tape motion control mechanism, a capstan as claimed in claim 10 and wherein the said means for applying a partial vacuum to the region of the diaphragm includes an annular space formed in the inner portion of the capstan and slots formed in the said one of the ferrules so as to communicate between the annular space and the region of the diaphragm.

12. A driving capstan for a flexible tape and including a stationary inner part; an outer part rotatable thereon; a cylindrical foraminated portion of the outer part; an air control valve located in said inner part comprising an electromagnet having a ferromagnetic core formed with a hole therethrough to form an orifice at a pole face thereof, a ferromagnetic diaphragm located adjacent the pole face to close the orifice when the electromagnet is energized and means for urging the diaphragm away from the pole face to open the orifice when the electromagnet is not energized; means for applying a partial vacuum to a region formed round the diaphragm; and a duct connecting said hole formed in the ferromagnetic core to at least part of said foraminated portion which is in contact with the tape.

References Cited in the file of this patent

UNITED STATES PATENTS

| | | |
|---|---|---|
| 2,778,634 | Gams et al. | Jan. 22, 1957 |
| 2,837,330 | Lawrance et al. | June 3, 1958 |
| 2,860,850 | Rhodes et al. | Nov. 18, 1958 |
| 2,866,637 | Pendleton | Dec. 30, 1958 |
| 2,954,911 | Baumeister et al. | Oct. 4, 1960 |